April 30, 1963 — J. DUNDAM — 3,087,561
EGG GRADING APPARATUS
Filed Feb. 21, 1961 — 2 Sheets-Sheet 1
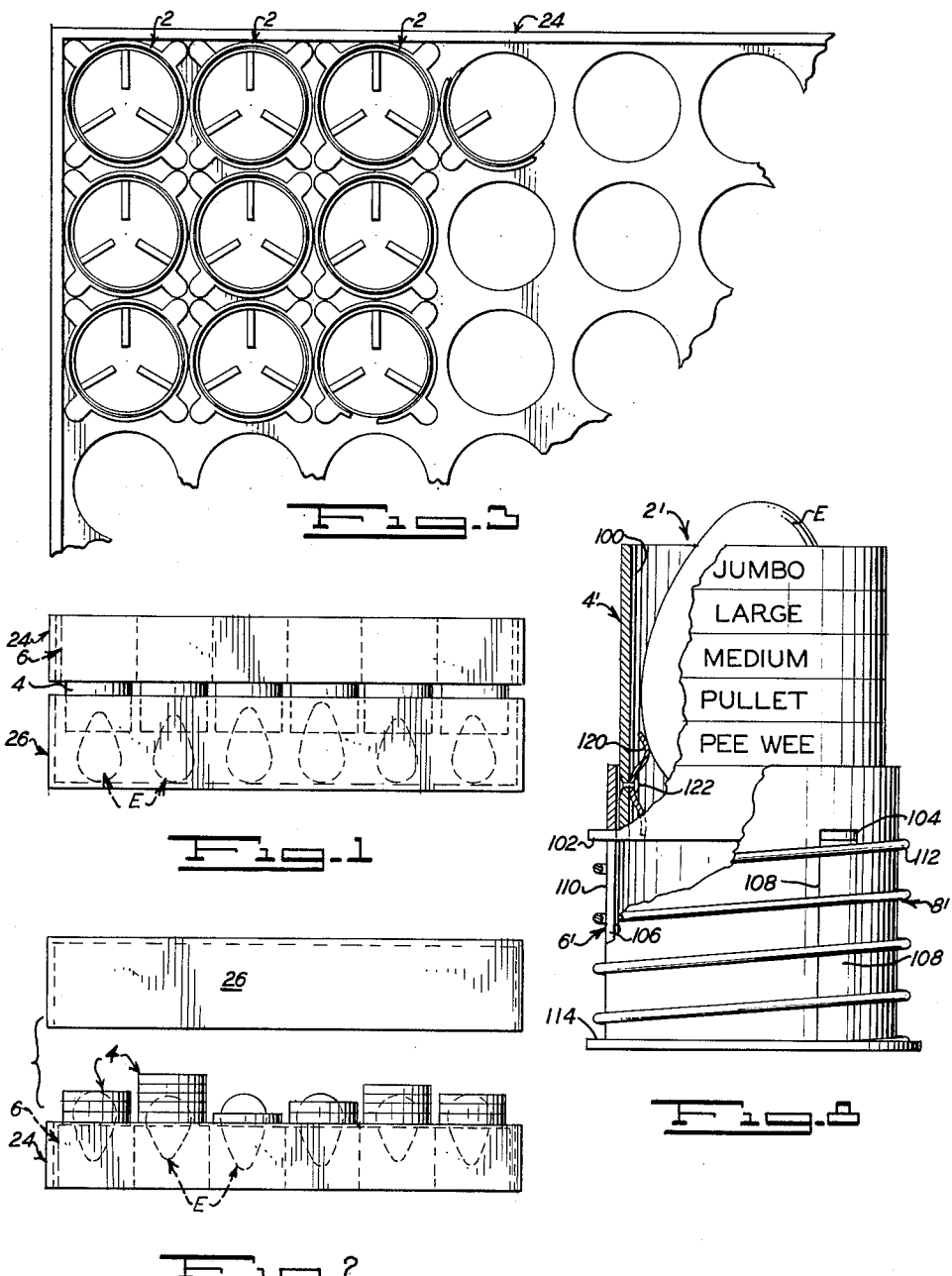
INVENTOR
JOHN DUNDAM
BY Jacobi & Jacobi
ATTORNEYS April 30, 1963   J. DUNDAM   3,087,561
EGG GRADING APPARATUS
Filed Feb. 21, 1961   2 Sheets-Sheet 2
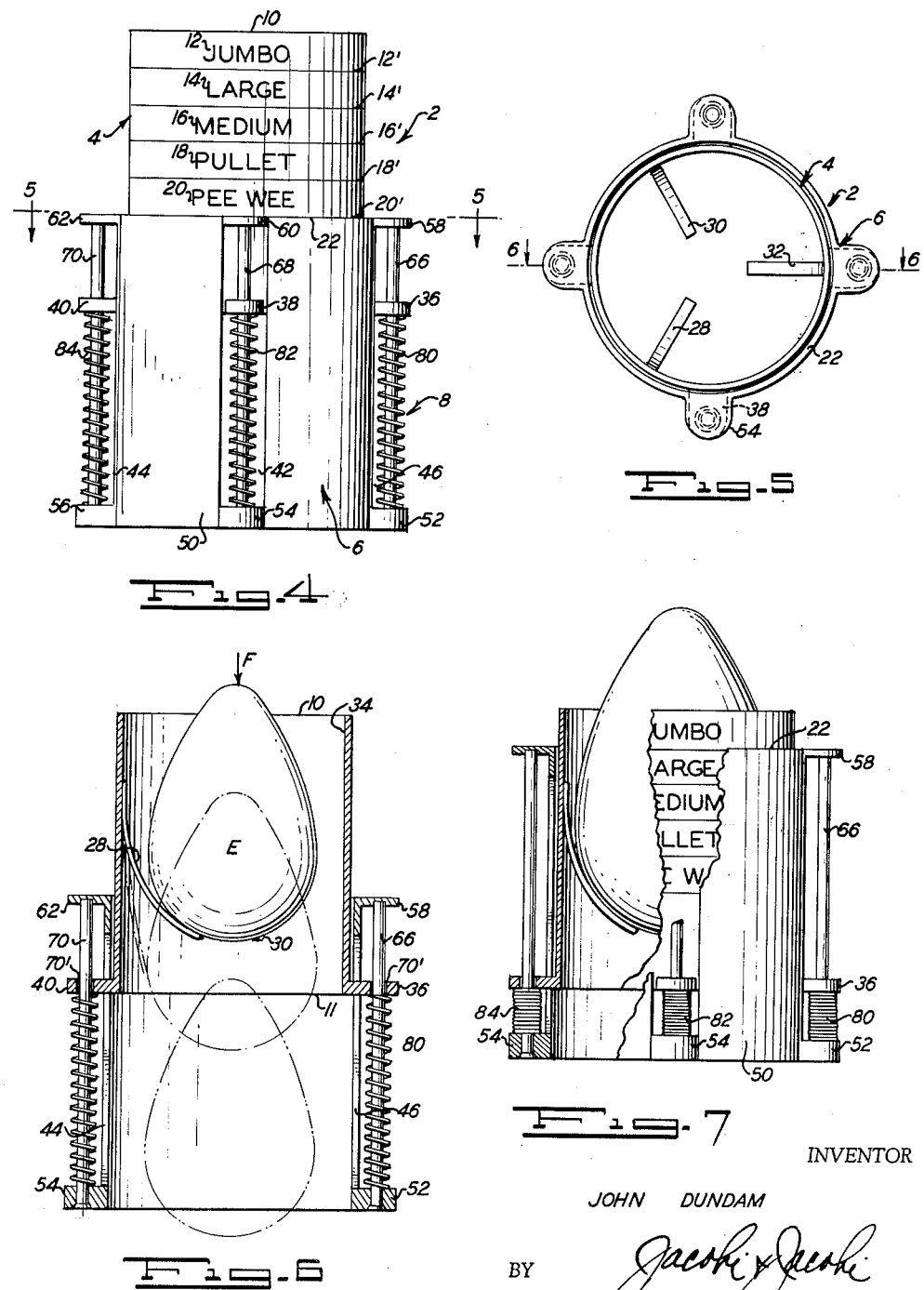
INVENTOR
JOHN DUNDAM
BY Jacobi & Jacobi
ATTORNEYS

United States Patent Office 3,087,561
Patented Apr. 30, 1963

3,087,561
EGG GRADING APPARATUS
John Dundam, 2 Chestnut St., Oneonta, N.Y.
Filed Feb. 21, 1961, Ser. No. 90,778
10 Claims. (Cl. 177—225)

This invention relates to apparatus for grading eggs, and particularly to apparatus readily adapted to easily and accurately classify eggs automatically.

In most if not all instances today, eggs are packaged and/or sold according to grade or weight. For this reason, those engaged in the egg industry face the problem of separating the eggs into differing grade classifications. Such classifications, at present, comprise: jumbo, large, medium, pullet, and pee wee respectively, from large to small, or from heavy to light.

While certain experts have obtained the skill of separating eggs by "feel" according to the human senses, in many instances experts are not available, and moreover, the experts are expensive labor when available. Thus, there exists the problem of providing some means which allows for grading the eggs rapidly and accurately. Various types of devices have heretofore been suggested for accomplishing this purpose; however, such devices generally require considerable manipulation, and accordingly some special skill in operation.

The present invention has as one of its primary objects the provision of an egg grading apparatus which requires a minimum of manipulation and which can be operated by any unskilled laborer to accurately classify a plurality of eggs simultaneously and instantaneously.

A still further primary object of the present invention is to provide such an egg grading apparatus which is adapted for use with the now-standard "three-dozen carton" used in the collection and initial handling of fresh eggs, but which can be used with or without other handling and/or storage devices.

Yet another, and still further primary object of the present invention is to provide an egg grading apparatus conforming with the preceding objects which is inexpensive in manufacture and trouble-free in operation, and which accordingly comprises a minimum number of easily-fabricated components.

In addition to the foregoing primary objects, the invention also has as one of its important objects, the provision of an egg grading apparatus conforming with all of the preceding objects, and in addition providing for selective discharge of eggs of any given grade or classification without discharge of eggs of another classification.

More specific, yet other important and primary objects of the present invention are: (a) to provide an egg grading apparatus as prescribed incorporating a plurality of egg grading units, each of which units comprises a base means, egg supporting frame means reciprocally mounted with respect to the base means, resilient means for normally urging the egg supporting frame means in elevated relation with respect to the base means, and an index and indications carried respectively by the base means and the egg supporting frame means whereby when an egg is placed in the supporting frame, the same moves vertically under the weight of the egg to a position where one of the indications is aligned with or adjacent the index whereby the grade of the particular egg in the unit is visually indicated automatically; (b) to provide an egg grading unit as prescribed in the preceding object, and further incorporating displaceable fingers in the egg supporting frame means of each unit, whereby after the grade of an egg has been indicated, the egg can be passed through the unit, by the fingers, and out of the unit through the end opposite that through which the egg was inserted into the unit; (c) to provide an egg grading unit as prescribed in the preceding objects, wherein each unit comprises a pair of sleeves, one of which is reciprocally mounted with respect to the other, and spring means normally maintaining one of the sleeves, namely, the egg supporting sleeve, in elevated relation to the other or base sleeve; (d) to provide such an egg grading unit wherein the top edge of the base sleeve serves as the index, and wherein the indications are carried by or imprinted on the outside of the other or egg supporting sleeve; and (e) to provide such an egg grading unit wherein the sleeves are provided with cooperating guide means to ensure proper support, reciprocal movement, and trouble-free operation.

The invention lies in the construction, arrangement, and combination of the various components of the egg grading apparatus as will become apparent after reading the following detailed description of the illustrative and preferred embodiments of the invention. Such description refers to the annexed drawings presenting such embodiments, and wherein:

FIGURE 1 is a side view presenting an egg grading apparatus constructed in accordance with the present invention as the same would appear initially when unsorted eggs were about to be transferred from a "mixed egg" container into the apparatus of the invention;

FIGURE 2 is a side view similar to FIGURE 1 showing the components of FIGURE 1 after the eggs have been transferred from the "mixed egg" container into the apparatus of the invention;

FIGURE 3 is a fragmental plan view taken from the top of the apparatus provided by the invention and showing the disposition of separate units of the apparatus;

FIGURE 4 is a side view of the preferred form of egg grading unit provided by the invention and incorporated in the overall apparatus of the invention for simultaneously grading a plurality of eggs;

FIGURE 5 is a plan view taken on the line 5—5 of FIGURE 4 and presenting the unit of FIGURE 4 as the same would appear when viewed from the top;

FIGURE 6 is a cross-sectional view of the unit shown in FIGURE 4, FIGURE 6 presenting the manner in which an egg is initially retained in the unit, and the manner in which an egg can thereafter be passed through the unit;

FIGURE 7 is a side view, partially broken away, and partially in section, presenting the components of the unit of FIGURE 4 as the same would appear after a "jumbo" egg has been inserted in the unit for grading and the same has moved to the "grade" position; and FIGURE 8 is a side view similar to FIGURE 7, partially broken away and partially in section, and presenting a modified form of egg grading unit constructed in accordance with the present invention.

The preferred form of egg grading unit, as suggested above, is presented in FIGURE 4, and this unit, generally designated by the numeral 2, comprises an egg supporting frame means generally designated by the numeral 4, base means generally designated by the numeral 6, and resilient means generally designated by the numeral 8. The egg supporting frame means 4 is open at the top end 10 thereof, and is provided with spaced-apart grade indications 12, 14, 16, 18 and 20 on the outside thereof representative of the standard grade classifications.

The base means 6 has an upper edge 22 which forms an index past which the grade indications 12–20 are movable. The resilient means 8 is in effect a depressible means which, as explained in more detail hereinafter, normally urges the frame means 4 vertically elevated, as shown, with respect to the base means 6; however, as also explained in more detail hereinbelow, the frame means 4 is reciprocally mounted with respect to the base means 6 whereby when an egg is placed through the end 10 of the unit into the frame means 4, the frame means, under the weight of the egg, moves downwardly, the weight of the egg acting against the force exerted on the frame means 4 by the resilient means 8 and causing the egg supporting frame means to move downwardly by a distance corresponding to the weight of the egg. This causes one of the grade indications 12, 14, 16, 18 or 20 to be aligned with or to be disposed adjacent the index, which in this instance is the top edge 22 of the base means 6. All eggs will, of course, not cause one of the lines 12', 14', 16', 18' or 20' to align exactly with the index, but the grade can still be visually observed by virtue of the word designations between the spaced-apart lines.

As shown in FIGURE 3, a plurality of egg grading units 2 are disposed within a main frame or case 24. Preferably, the frame 24 houses 36 grading units 2, and the grading units are disposed in rows of 6 whereby the main frame supports 36 equally spaced units. The reason for this particular construction is that the normal fresh egg "mixed" carton contains 36 sections, and the preferred apparatus is adapted to simultaneously grade 36 eggs from a given mixed carton instantaneously.

In FIGURE 1, the initial or mixed carton is designated by the numeral 26. This carton is placed on a suitable support surface (not shown), and then the main frame 24 is inverted and placed over the carton 26. The main frame 24 and units 2 are so constructed that each of the egg support frames 4 is disposed above one egg within the carton 26. After this initial step has been taken, and the components have been placed in the position shown in FIGURE 1, then the carton and main frame are simultaneously inverted. This results in each of the eggs E being placed within an egg supporting frame 4 of each of the units 2, as shown in FIGURE 2. After the "mixed" carton and main supporting frame 24 have been inverted and assume the position shown in FIGURE 2, then the "mixed" carton 24 can be removed and used for the collection and handling of fresh eggs again, or even for collection of sorted eggs if desired.

When the eggs are transferred, as described above, from the "mixed" carton 26 to the frame 24, and the individual grading units 2 carried therein, then each of the eggs is maintained in the egg support frame means 4 by a plurality of fingers projecting inwardly from the side walls of the frame means 4. Particular reference is made to FIGURE 6 wherein two such fingers are designated by the numerals 28 and 30. Preferably, as shown in FIGURE 5, three fingers 28, 30 and 32 are provided within the egg supporting frame means 4, and preferably the egg supporting frame means comprises a cylinder or sleeve 34 open at both the top end 10 and the bottom end 11 thereof. The fingers 28, 30 and 32 utilized in the preferred embodiments of the invention comprise arcuate leaf springs which are welded, or otherwise suitably attached to the inside walls of the sleeve 34 intermediate the ends thereof, whereby the fingers support the bottom of an egg E when the same is placed within the sleeve 34.

In addition to being provided with the spring fingers, as described above, each of the sleeves 34, i.e., sleeve 34 of each unit 2, is preferably provided at the base thereof with laterally projecting guide flnages 36, 38 and 40. These guide flanges pass through suitable vertical slots 42, 44 and 46 provided in the base means or member 6 which also preferably comprises a sleeve 50.

As should be apparent from the drawings themselves, the egg supporting sleeve 34 is preferably cylindrical and has a smaller external diameter than the internal diameter of the cylindrical sleeve 50 forming the base member or means, and the guide flanges 36, 38 and 40 project through the slots 42, 44 and 46 whereby the egg supporting sleeve 34 is reciprocally mounted with respect to the base sleeve 50.

The cylindrical base sleeve 50, like the cylindrical egg supporting sleeve 34, is preferably provided with flanges projecting laterally thereof at the base. These flanges are designated in the drawings by the numerals 52, 54 and 56. The base sleeve 50, in addition to having the base flanges 52, 54 and 56, is preferably provided with top flanges 58, 60 and 62. A suitable post or guide bar extends between the aligned laterally-projecting base flanges 52, 54 and 56 of the base member and the corresponding laterally-projecting top flanges 58, 60 and 62 respectively. These posts are designated by the numerals 66, 68 and 70.

As explained above, the sleeve 34 is reciprocally mounted with respect to the base sleeve 50, and thus, according to the invention, each of the guide flanges 36, 38 and 40 is provided with a suitable bore 70' through which the posts 66, 68 or 70 can pass, whereby the guide flanges 36, 38 and 40 are reciprocal on the posts 66, 68 and 70.

Also, according to the preferred embodiment of the invention, a compression spring surrounds each of the posts and extends between the underside of a guide flange and the top side of a base flange. More particularly, the spring 80 extends in surrounding relation to the post 66 between the top side of the base flange 52 and the underside of the guide flange 36; the spring 82 extends in surrounding relation to the post 68 between the top side of the base flange 54 and the underside of the guide flange 38; and the spring 84 extends in surrounding relation to the post 70 between the underside of guide projection 40 and the top side of base flange 56. The compression springs 80, 82 and 84 are compressible varying degrees within the range of weight of ordinary eggs inserted in the apparatus. Thus, as an egg is placed within the cylinder 34, through the top end 10 thereof, it engages the spring arms 28, 30 and 32, and comes to rest within the sleeve 34. The weight of the egg then acts through the sleeve 34 and the guide flanges 36, 38 and 40, against the action of the compression springs 80, 82 and 84, and the sleeve 34 moves downwardly from the position shown in FIGURES 4 and 6 by an amount depending on the weight of the egg. Assume, for example, that a "jumbo" egg is inserted in the unit of FIGURE 4. This egg causes the compression springs to be compressed whereby the sleeve 34 moves downwardly assuming the position shown in FIGURE 7. The springs are compressed, as explained, and as the same are compressed and the sleeve 34 moves downwardly, the grade indications 12—14—16—18—20 move down with respect to the top edge or index 22 carried by the base sleeve 50. When a "jumbo" egg is inserted in the unit, then the sleeve 34 moves downwardly whereby the "jumbo" indication is aligned with the index 22. Thus, the grading apparatus provides a visual indication automatically of the grade of the egg carried in each unit.

Since different grades of eggs are carried in each unit, or are transferred into each unit from the "mixed" carton initially, the cylinders 34 of the various units 2 provided in the main frame 24 move downwardly differing amounts. As an example, the various units may assume the positions shown in FIGURE 2 after initial transfer of eggs from a "mixed" carton. Thus, if 36 eggs are transferred as explained hereinabove, then automatically and simultaneously and instantaneously 36 eggs are graded by the respective units. Now, having a grade indication of all the eggs, the operator or worker normally would desire to separate the eggs according to grade. To achieve this end, all the operator need do is apply, by hand, downward force to the top of the egg E, i.e., apply a force in the direction of arrow F shown in FIGURE 6. As the force F is applied to the top of the egg by the hand, the spring fingers 28, 30 and 32 are displaced or moved outwardly from their normal positions, and the egg is allowed to pass downwardly as shown by dotted lines in FIGURE 6, and out of the bottom of the unit. Thus, if all of the jumbo eggs are to be separated initially, then the operator merely presses down on all of the jumbo eggs releasing the same from the bottom of the apparatus and placing the same in any suitable container (not shown). Then the operator would proceed with the next grade of eggs, placing the same in a different container disposed below the unit. This process would continue until all of the eggs had been graded or classified. Then the apparatus of the invention could be used for grading another "mixed" carton.

While I have not referred in detail to the manner in which the components are secured in place, it should be apparent that welding or any other suitable means can be used as desired. If the components are made of plastic, then a suitable heat weld can be used, and if the components are made of metal, then a suitable spot weld can be used. It should also be apparent, that the slots 42, 44, and 46, as provided in an initially-fabricated sleeve 50, may be open at the lower end thereof whereby the cylinder or sleeve 34 can be inserted within the sleeve or cylinder 50 with the guide flanges 36, 38 and 40 projecting through the slots. After this operation is complete, then the base member provided with the base flanges 52, 54 and 56 can be inserted or attached to the bottom of the cylinder 50. Of course, the base flanges 52, 54 and 56 can be part of an overall member attached to the bottom of the sleeve or cylinder 50, or can be individual flanges welded in place as shown.

Although the egg supporting frame means and base means have been shown as comprising cylindrical sleeves, any suitable shapes can be used. Moreover, separate indices and grade indications can be incorporated as opposed to the integral index and imprinted designations shown. However, the preferred embodiments present a simplified unit and thus represent important aspects of the invention.

As suggested hereinabove, a modified unit provided by the invention is presented in FIGURE 8 and generally designated by the numeral 2'. This unit is quite similar to the embodiment described hereinabove. The same includes an egg supporting frame 4', a base means or member 6', and a resilient means 8'. The egg supporting frame 4' comprises a cylindrical sleeve 100 similar to the cylindrical sleeve 4, and having laterally-projecting guide flanges 102 and 104. These guide flanges project within and from the slots 106 and 108 provided in cylindrical base sleeve 110. Instead of using the guide posts 66, 68 and 70 as shown in the embodiment discussed previously, the FIGURE 8 construction employs a compression spring 112 which serves as the resilient means, and which surrounds the lower or base sleeve 110. The compression spring 112 extends between a circumferential flange 114 carried at the base of the lower cylindrical sleeve 110, and the laterally-projecting guide flanges 102 and 104.

The sleeve 100 is, of course, reciprocal within the sleeve 110 in exactly the same manner as the sleeve 34 is reciprocal within the sleeve 50 of the preferred embodiment of the invention. Operation is also essentially the same. Another difference, however, not alluded to hereinabove, is the different type of spring fingers utilized within the sleeve 100. These fingers, designated by the numeral 120, comprise concavo-convex spring members riveted centrally by means of the rivet 122 to the egg supporting sleeve 100 whereby the spring fingers 120 project in the path of eggs inserted within the sleeve 100 and serve to normally support the same therein. These spring fingers, like the spring fingers 30, 32 and 28, are deformable whereby, when pressure is applied to the top of an egg, after the same has been graded, the egg can be passed by the spring fingers 120 and out through the bottom of the unit.

Since the operation of the embodiment of FIGURE 8 is essentially the same as the operation of the other embodiments, there appears to be no need to repeat the operation in detail. Either the unit which comprises the preferred embodiment of the invention or the unit which comprises the FIGURE 8 embodiment, as displayed herein, can be used within the main frame 24. Preferably, the base flanges of each of the units 2 or 2' are secured together whereby the units are disposed in rows, and the outside units are secured to the frame by any suitable means such as by welding to provide the overall apparatus for simultaneously grading a plurality of eggs.

After reading the foregoing detailed description of the illustrative and preferred embodiments of the invention, it should be apparent that the objects set forth at the outset of this specification have been successfully achieved. Modifications of the embodiments shown and described may become apparent to those of ordinary skill in the art after reading the foregoing description, and objects other than those specifically set forth may also become apparent. Accordingly, what is claimed is:

1. Apparatus for grading eggs comprising an egg supporting frame means having at least two spaced-apart grade indications on the outside thereof; said egg supporting frame means being open at both ends and provided with displaceable egg engaging fingers therein whereby an egg inserted through one end of said egg supporting frame means can be passed out of the other end thereof by displacing said fingers; base means having an index thereon and reciprocally supporting said egg supporting frame means; and resilient means normally urging said egg supporting frame means vertically elevated with respect to said base means and being deformable varying degrees within the range of normal egg weights whereby when an egg is placed in said egg supporting frame through said one end, the weight of said egg acts against said resilient means causing said egg supporting frame means to move vertically downward by a distance corresponding to the weight of the egg thereby placing a grade indication adjacent said index.

2. Apparatus for grading eggs as defined in claim 1 wherein said base means comprises a first sleeve member, wherein said egg supporting frame means comprises a second sleeve member, reciprocal within said first sleeve member, and wherein said resilient means comprises spring means cooperating with said sleeve members.

3. Apparatus for grading eggs comprising a base sleeve at least open at one end and having spaced-apart vertical slots therein, said base sleeve having a stationary index, an egg support sleeve at least open at one end and having guide flanges projecting laterally thereof, said support sleeve being mounted in said base sleeve with said flanges projecting through said slots whereby said support sleeve is movable vertically within said base sleeve from a top position to a bottom position, said support sleeve carrying spaced grade indications on the outside thereof, spring means cooperating with said flanges to normally urge said support sleeve to said top position, said spring means being deformable different amounts by the weights of different eggs whereby an egg placed in said support sleeve causes said support sleeve through said flanges to deform said spring means and thereby move said support sleeve from said top position toward said bottom position by an amount proportional to the weight of the egg therein and said indications to move adjacent said index to provide a visual indication of egg grade.

4. Apparatus for grading eggs as defined in claim 3 wherein said base sleeve is open at both ends, wherein said egg support sleeve is open at both ends, and wherein deformable spring fingers are carried within said support sleeve to normally maintain an egg placed in said support sleeve through said one end in said support sleeve and to permit an egg to be passed under pressure between said fingers, through the other end of said support sleeve, and out of said apparatus.

5. Apparatus for grading eggs as defined in claim 4 wherein said base sleeve is provided with flange means projecting laterally thereof and with spaced-apart vertical slots extending above said flange means, wherein said egg support sleeve is provided with guide flanges projecting through said slots, and wherein said spring means is disposed between said flange means on said base sleeve and said guide flanges.

6. Apparatus for grading eggs as defined in claim 5 wherein said spring means comprises a compression spring surrounding said base sleeve.

7. Apparatus for grading eggs as defined in claim 5 wherein said apparatus further includes posts projecting vertically upward from said flange means on said base sleeve, wherein said guide flanges are provided with bores for reciprocally slidingly mounting said guide flanges on said posts, and wherein said spring means comprise compression springs carried in encasing relation to each of said posts.

8. Apparatus for grading eggs as defined in claim 5 wherein said grade indications are carried on the outer surface of said egg supporting sleeve, and wherein said index comprises the top edge of said base sleeve.

9. Apparatus for simultaneously grading a plurality of eggs, comprising a main frame and a plurality of grading units disposed in rows within said main frame, each of said units comprising an egg supporting frame means having at least two spaced grade indications on the outside thereof; each of said egg supporting frame means being open at both ends and provided with displaceable egg engaging fingers therein whereby an egg inserted through one end of said egg supporting frame means can be passed out of the other end thereof by displacing said fingers; base means having an index thereon and reciprocally supporting said egg supporting frame means; and depressible means normally urging said frame means vertically elevated with respect to said base means and being depressible varying degrees within the range of normal egg weights whereby when an egg is placed in any of said egg supporting frame means through said one end, the weight of said egg acts against said depressible means of the unit causing said egg supporting frame means to move vertically downward by a distance corresponding to the weight of the egg thereby placing a grade indication adjacent said index of the unit.

10. Apparatus for grading eggs comprising an egg supporting frame means having at least two spaced apart grade indications on the outside thereof, said egg supporting frame means being open at both ends and provided with means therein for releasably engaging an egg inserted through one end thereof whereby the egg can be selectively passed out of the other end thereof, base means reciprocally supporting said egg supporting frame means, index means carried by said base means, and resilient means normally urging said egg supporting frame means vertically elevated with respect to said base means and being deformable varying degrees within the range of normal egg weights whereby when an egg is placed in said egg supporting frame through said one end, the weight of said egg acts against said resilient means causing said egg supporting frame means to move vertically downward by a distance corresponding to the weight of the egg thereby placing a grade indication adjacent said index.

References Cited in the file of this patent

UNITED STATES PATENTS

| | | |
|---|---|---|
| 374,759 | Segog | Dec. 13, 1887 |
| 1,209,651 | Adelmo et al. | Dec. 26, 1916 |
| 1,498,920 | Kelso | June 24, 1924 |
| 2,080,446 | Templeman | May 18, 1937 |

FOREIGN PATENTS

| | | |
|---|---|---|
| 684,079 | Germany | Mar. 11, 1930 |